United States Patent
Edge

(10) Patent No.: US 8,681,401 B2
(45) Date of Patent: Mar. 25, 2014

(54) METHOD FOR OPTIMIZING DISPLAY PROFILES

(75) Inventor: Christopher J. Edge, St. Paul, MN (US)

(73) Assignee: Eastman Kodak Company, Rochester, NY (US)

( * ) Notice: Subject to any disclaimer, the term of this patent is extended or adjusted under 35 U.S.C. 154(b) by 314 days.

(21) Appl. No.: 12/570,237

(22) Filed: Sep. 30, 2009

(65) Prior Publication Data

US 2010/0079829 A1 Apr. 1, 2010

Related U.S. Application Data

(63) Continuation-in-part of application No. 12/404,551, filed on Mar. 16, 2009.

(60) Provisional application No. 61/100,804, filed on Sep. 29, 2008.

(51) Int. Cl.
*H04N 1/46* (2006.01)
*H04N 1/60* (2006.01)
*G03F 3/08* (2006.01)
*G06K 15/00* (2006.01)
*G09G 5/10* (2006.01)

(52) U.S. Cl.
USPC ............ 358/504; 358/1.9; 358/518; 358/2.1; 358/523; 358/509; 345/690

(58) Field of Classification Search
USPC ................ 358/504, 1.9, 518, 2.1, 523, 509; 345/690

See application file for complete search history.

(56) References Cited

U.S. PATENT DOCUMENTS

| 6,327,052 B1 * | 12/2001 | Falk ........................ 358/1.9 |
| 7,209,147 B2 | 4/2007 | Edge |
| 7,215,343 B2 | 5/2007 | Edge |
| 2005/0068550 A1 | 3/2005 | Braun |
| 2008/0158579 A1 * | 7/2008 | Ohga et al. ................ 358/1.9 |
| 2010/0289835 A1 * | 11/2010 | Holub ........................ 345/690 |

FOREIGN PATENT DOCUMENTS

WO  WO 02/076086 A1  9/2002
WO  WO 2004/068845 A1  8/2004

OTHER PUBLICATIONS

U.S. Appl. No. 12/533,313, filed Jul. 31, 2009, entitled "A Method for Converting Digital Color Images", by Edge.

* cited by examiner

*Primary Examiner* — Charlotte M Baker
*Assistant Examiner* — Ruby Grisham
(74) *Attorney, Agent, or Firm* — Nelson Adrian Blish

(57) ABSTRACT

A method for compensating for effects of illumination when comparing soft proofs to hard copy proofs viewed under non-standard illumination comprises adjusting a standard illumination display profile until estimates of device independent colors produced by the display based on the adjusted profile match the colors corresponding to the non-standard illumination within a predefined tolerance.

7 Claims, 3 Drawing Sheets

METHOD FOR OPTIMIZING DISPLAY PROFILES

CROSS REFERENCE TO RELATED APPLICATIONS

This application is a continuation-in-part of U.S. patent application Ser. No. 12/404,551, filed Mar. 16, 2009, which claims the benefit of U.S. Provisional Patent Application No. 61/100,804, filed Sep. 29, 2008, each of which is incorporated herein by reference in its entirety.

FIELD OF THE INVENTION

This invention relates to adjusting an existing accurate display profile or modifying conversions to the profile in order to simulate the effects of imperfect standard lighting, such as fluorescent tubes that are designed to simulate D50 lighting.

BACKGROUND OF THE INVENTION

Fluorescent tubes that are designed to mimic the behavior of daylight (such as the D50 standard for daylight simulation) follow the requirements of international specifications in lighting, for example ISO 3664. These standards were optimized for the requirements of hard copy proofing. This means that different print media such as an ink jet proof and a press sheet must match numerically and visually under a daylight simulator, if calculations using the D50 standard illumination predict that the colors will match.

The standards are less rigorous with regard to the absolute simulation of D50 for a D50 simulator. For example, a solid yellow color printed with an ink jet printer and printing press might shift by 5 ΔE in the direction of green for a particular D50 simulator. That lighting may still be considered an acceptable approximation to D50 as long as the difference between the two colors is small.

This qualification of tubes based on relative versus absolute simulation of D50 is problematic when one attempts to match a display to a printed image viewed in a D50 simulator. In this case, the display may be calibrated and profiled in order to simulate colors viewed with theoretical D50. The ΔE match to D50 can be made very accurate in an absolute sense. If the D50 simulator in fact is significantly different spectrally from D50, resulting in significant shifts in absolute color rendering, there will be significant differences between the printed image in the D50 simulator and the image on the display.

For those who care about such challenges, it is possible to address this issue by measuring the spectra of the illumination, recalculating the values of XYZ and CIELAB, and creating a new ICC profile for characterizing the printed color media. The challenge of this approach is that all profiles would have to be so created for that viewing environment, as well as databases of spot colors which typically contain lists of CIELAB values for each named color, such as lists of Pantone™ color libraries. Although this approach may well be convenient in the future, it is not convenient with current color management infrastructure which is optimized for CIELAB with theoretical D50 illumination.

SUMMARY OF THE INVENTION

The present invention is a method for compensating for effects of illumination when comparing soft proofs to hard copy proofs viewed under a non-standard illumination that differs from a standard illumination. As shown in FIG. 1, the method comprises obtaining (110), for a set of print colors, device-independent color data corresponding to the standard illumination and obtaining (120), for the set of print colors, device-independent color data that corresponds to the non-standard illumination. The method further comprises estimating (130) first device independent color data to be measured on a display for each color when rendering the set of print colors to the display using the device-independent color data corresponding to the standard illumination and a display profile constructed from color data corresponding to the display, estimating (140) second device independent color data to be measured on the display if the display profile is adjusted, calculating (150) differences between the second device-independent color data and the device-independent color data for the print colors corresponding to the standard illumination and adjusting (160) the display profile to reduce the differences.

According to one aspect of the invention, display profiles can be adjusted with chromaticity changes and/or black point changes to facilitate matching printed colors viewed under non-standard illumination.

DETAILED DESCRIPTION OF THE INVENTION

Figure 1:
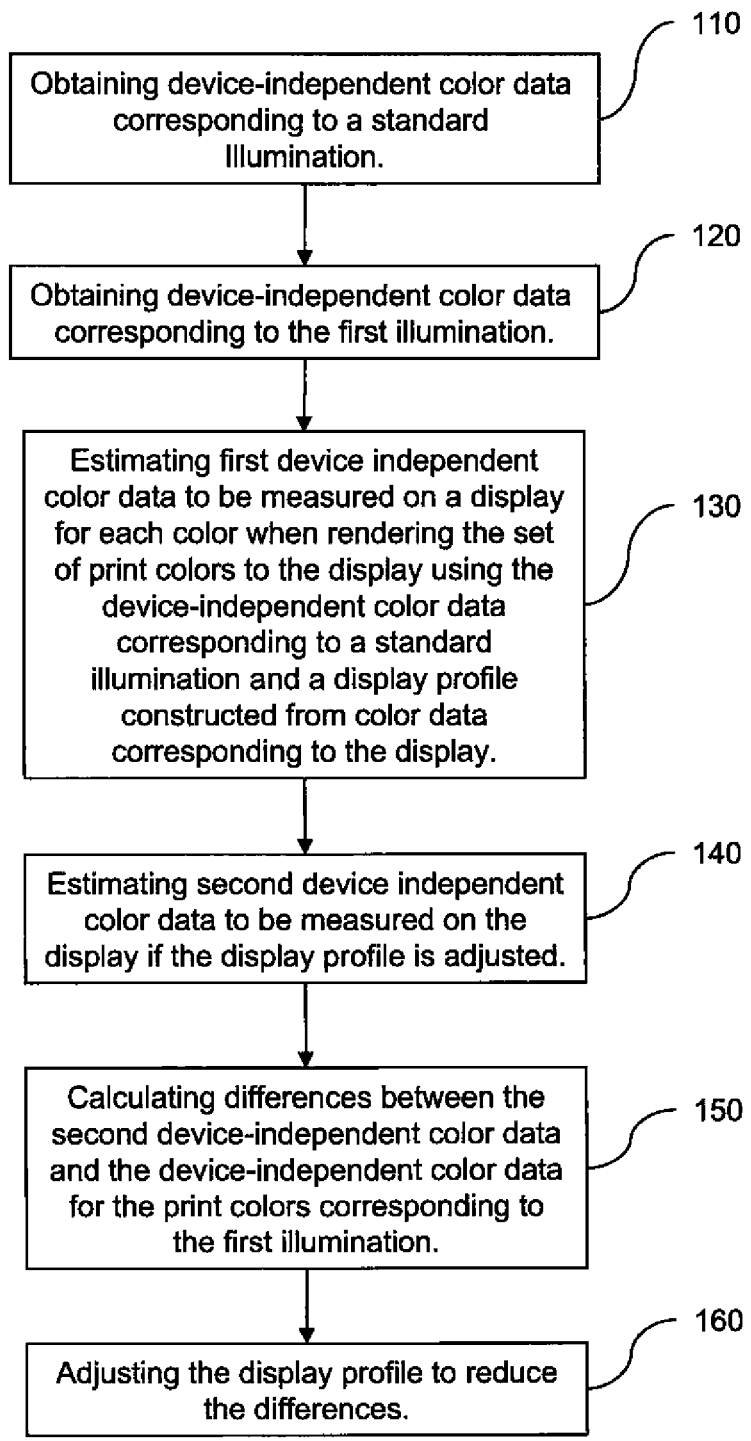
FIG. 1 is a flow chart showing a method for compensating for effects of illumination when comparing soft proofs to hard copy proofs viewed under a first illumination.

The present invention is a method for compensating for effects of illumination when comparing soft proofs to hard copy proofs viewed under a non-standard illumination that differs from a standard illumination. As shown in FIG. 1, the method comprises obtaining (110), for a set of print colors, device-independent color data corresponding to the standard illumination and obtaining (120), for the set of print colors, device-independent color data that corresponds to the non-standard or first illumination.

The method further comprises estimating (130) first device independent color data produced by a display for each color when rendering the set of print colors to the display using the device-independent color (DIC) data corresponding to the standard illumination and a display profile constructed from color data corresponding to the display. As an example, measured DIC values for a print color in D50 illumination can be converted to RGB display values using a display profile for a display calibrated to D50. The resultant RGB values can then be converted to DIC values using the same profile. The resultant DIC values may equal the print DIC values or may differ due to gamut mapping and/or interpolation errors in the profile.

Next the method comprises estimating (140) second device independent color data produced by the display if the display profile is adjusted to compensate for the non-standard illumination, calculating (150) differences between the second device-independent color data and the device-independent color data for the print colors corresponding to the non-standard or first illumination and further adjusting (160) the display profile to reduce the differences.

The device-independent color data corresponding to the standard illumination can be obtained by determining the reflectance spectra for each print color in the set of print colors and calculating the device independent color data using the standard illumination and the first illumination. The device independent color data for the first (non-standard) illumination can be calculated from direct emissive spectral measurement from the printed piece illuminated by the first illumination. Alternatively, the device independent color data can be determined from profiles corresponding to either the standard illumination or the first illumination.

Figure 2:
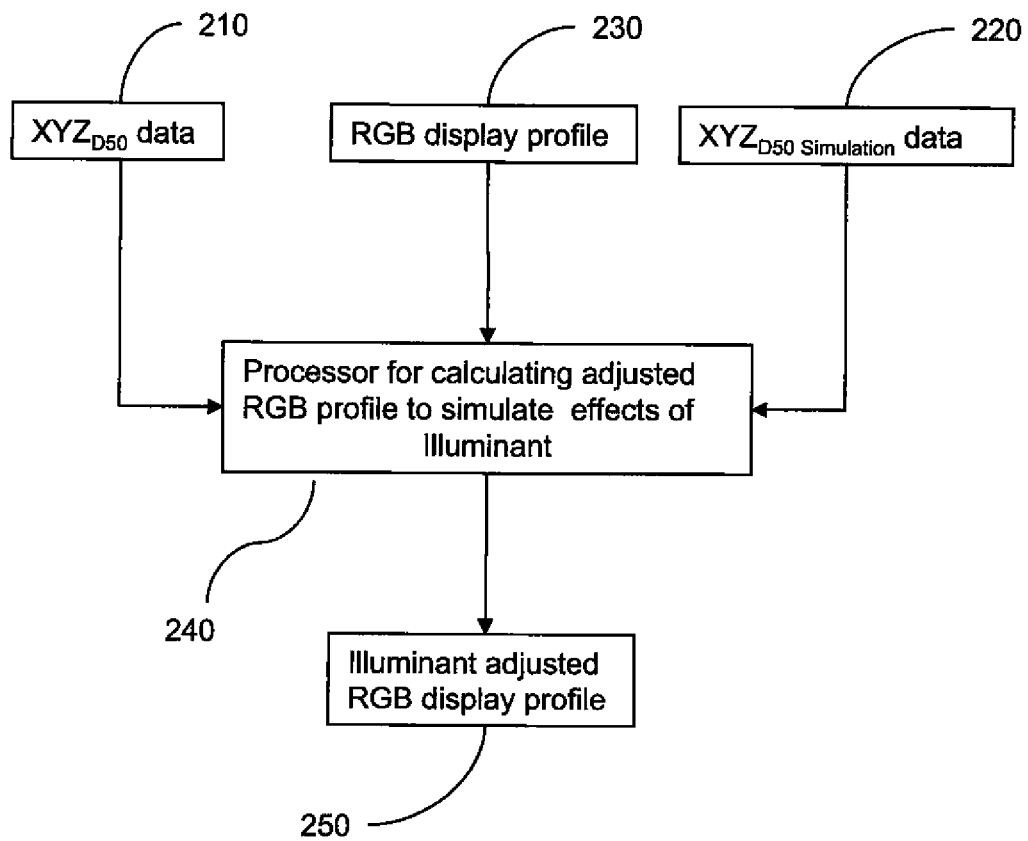
FIG. 2 shows a processor for determining an adjusted RGB profile to simulate the effects of non-standard illumination.

In one embodiment, the present invention proposes to address the above problem via optimized adjustment of the RGB ICC profile used to render color images to the display. The method is executed using the processor system shown in FIG. 2, where the processor 240 uses, for example, $XYZ_{D50}$ data 210, $XYZ_{D50Simulation}$ data 220 (i.e. D50simulation=non-standard illumination), and a RGB display profile 230 to calculate an adjusted RGB profile to simulate the effects of the first illumination and output an illuminant adjusted RGB display profile 250.

Figure 3:
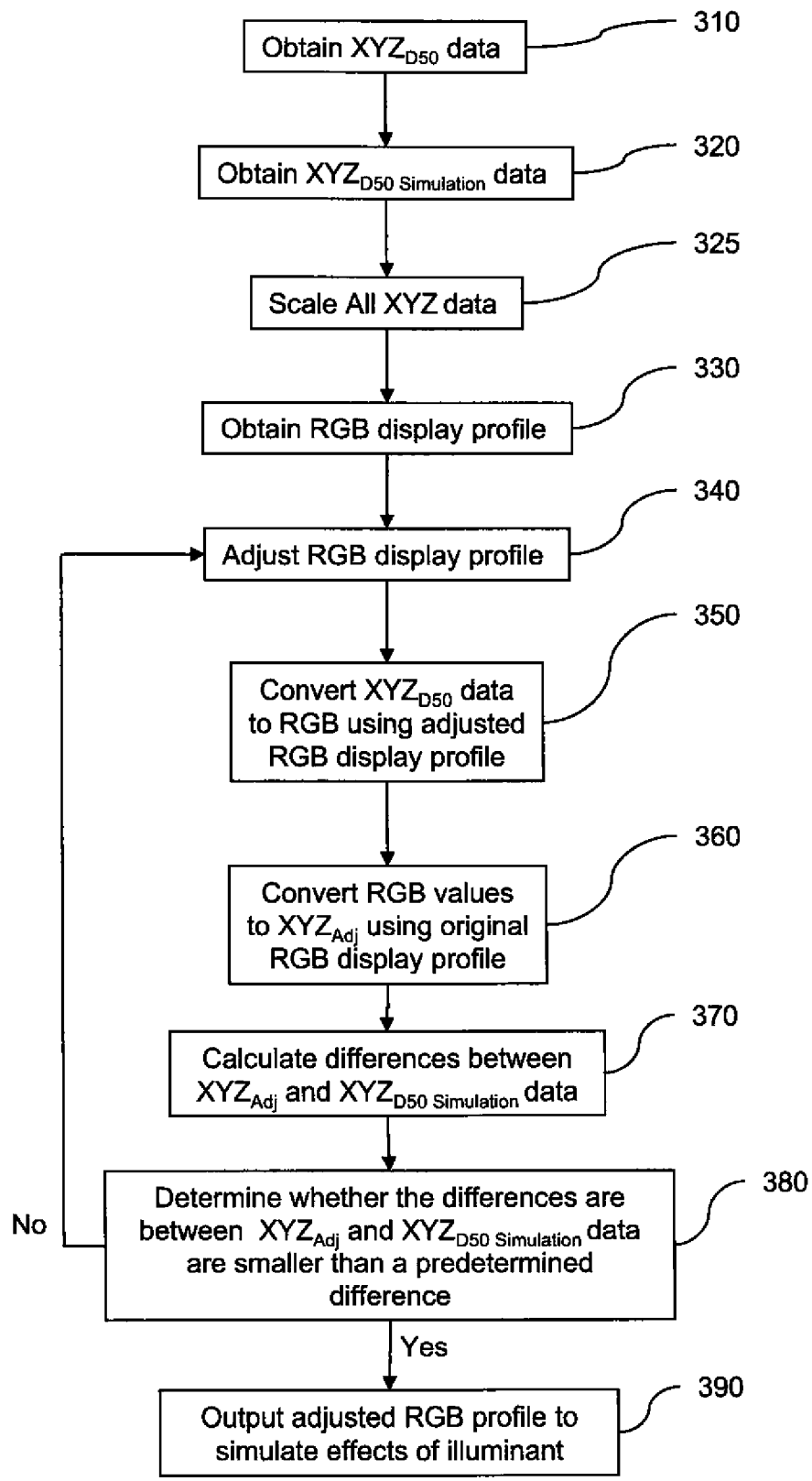
FIG. 3 is a flow chart showing a detailed method for compensating for effects of illumination when comparing soft proofs to hard copy proofs viewed under a first illumination.

The method, as shown in detail in FIG. 3, is as follows:

Measure (310) CIELAB (or other colorimetric data) or spectral reflectance data for a set of printed colors using a standard reflective measurement device set to D50 or some other chosen reference illuminant;

measure (320) the same colors emissively under the illumination of the D50 simulator or calculate the anticipated emissive measurement by multiplying the spectra of the D50 simulator by the spectral reflectance if so measured in the step above;

for each color, scale (325) the emissive XYZ data and calculate CIELAB by comparing the reflective and emissive data of the whitest color and multiplying each $XYZ_{emissive}$, by $XYZ_{reflective}/XYZ_{emissive}$ for the whitest color sample;

identify (330) a display profile that accurately converts RGB to XYZ and XYZ to RGB for that display;

adjust (340) the display profile's chromaticities, black point or both;

convert (350) each value of $XYZ_{D50}$ to $RGB_{display}$ using the adjusted display profile;

convert (360) $RGB_{display}$ to $XYZ_{Adj}$ with the unadjusted profile;

calculate (370) differences between $XYZ_{Adj}$ and $XYZ_{D50Simulation}$;

determine (380) whether the differences between $XYZ_{Adj}$ and $XYZ_{D50Simulation}$ are smaller than a predetermined difference;

if the differences are, smaller than the predetermined difference, then output and save the adjusted RGB display profile, else go back to (340) above.

continue the above process until $XYZ_{Adj}$ and $XYZ_{D50\ Simulation}$ are within acceptable tolerances; and output (390) adjusted RGB profile to simulate effects of illuminant.

Steps (350, 360, and 370) above determine the impact of modifying the RGB profile by converting the colors to the RGB values of the display as though it were performed using color management, then using the accurate unadjusted profile to estimate the measured impact of the adjustment. This should preferably be accomplished by converting $XYZ_{Adj}$ and $XYZ_{D50\ Simulation}$ to $CIELAB_{Adj}$ and $CIELAB_{D50\ Simulation}$ in order to reduce the error to below a predetermined value in a perceptually uniform color space. An automated approach to the difference reduction process is to define a cost function such as the sum of the squares of the $\Delta E$ differences between $CIELAB_{Adj}$ and $CIELAB_{D50\ Simulation}$ for the sample set of colors, and proceed to reduce the cost function to below a predetermined value by adjusting the parameters that define the RGB display profile. Well known methods such as Powell's method can be used to perform the automatic iterative error reduction of the cost function.

In one embodiment of the present invention, steps 310 or 320 can be performed by using a profile for the print colors constructed using values of L*a*b* calculated using standard D50 illumination or the simulated D50 illumination and by converting each CMYK color value to $XYZ_{D50}$ and $XYZ_{D50\ Simulation}$, thereby simulating the results of steps 310 and 320.

Regarding adjustments to the RGB profile, the effects of most D50 simulators can be addressed for chromatic colors by adjusting the values of chromaticities x, y for each RGB channel. Further improvement can be obtained by performing selective adjustments to the 6 RGBCMY vertices of the RGB gamut as described in commonly-assigned U.S. Patent Application Publication No. 2006/0181723 (Edge). In recent tests, accuracy of approximately 1–1.5 $\Delta E$ precision was achieved by adjusting chromaticities only, and nearly 0 error achieved by further adjusting the RGBCMY vertices of the RGB profile.

Since spectral measurement devices are often limited in resolution, the actual magnitude of $\Delta E$ differences between the appearance of colors under D50 illumination versus under illumination from a D50 simulator may be correct in direction of color but understated in magnitude. A multiplication coefficient, for example, can be used to increase all differences in $\Delta L^*$, $\Delta a^*$, $\Delta b^*$, etc. in order to capture the true magnitude of visual difference prior to performing the adjustment of the display profile. In an actual test, it was found that multiplying all differences by a factor of 2 exactly captured the true impact of using approximated or simulated D50 illumination versus using actual D50 illumination.

In other embodiments of the present invention, further correction accuracy and reduction of the cost function can be achieved by adjusting the value of the black point of the RGB profile. Two examples for adjusting the black point are as follows:

EXAMPLE 1

Adjust the black point values $R_{BP}$, $G_{BP}$, and $B_{BP}$. The tone characteristic behavior of an emissive system can be described as:

$$R_{lin} = (1.0 - R_{BP})R^{\gamma R} + R_{BP} \quad \text{(Eq. 1)}$$

$$G_{lin} = (1.0 - G_{BP})G^{\gamma G} + G_{BP} \quad \text{(Eq. 2)}$$

$$B_{lin} = (1.0 - B_{BP})B^{\gamma B} + B_{BP} \quad \text{(Eq. 3)}$$

The linear values $RGB_{lin}$ can then be converted to XYZ via a matrix comprising of the XYZ values for the red, green, blue channels:

$$\begin{pmatrix} X \\ Y \\ Z \end{pmatrix} = \begin{pmatrix} X_R & X_G & X_B \\ Y_R & Y_G & Y_B \\ Z_R & Z_G & Z_B \end{pmatrix} \begin{pmatrix} R_{lin} \\ G_{lin} \\ B_{lin} \end{pmatrix} \quad \text{(Eq. 4)}$$

By adjusting the values of $R_{lin}$, $G_{lin}$, and $B_{lin}$, as well as values of chromaticity, the XYZ values of the profile are modified in order to achieve optimal results for steps 1-9 above.

EXAMPLE 2

Perform a BPC transform on XYZ. In this second approach, the values of $R_{lin}$, $G_{lin}$, and $B_{lin}$ above are left unchanged and a transform is applied to XYZ resulting from Equation 4 above. The transform can be described as follows:

$$\begin{pmatrix} X' \\ Y' \\ Z' \end{pmatrix} = \begin{pmatrix} f(X, X_{WP}, X_{BP}) \\ f(Y, Y_{WP}, Y_{BP}) \\ f(Z, Z_{WP}, Z_{BP}) \end{pmatrix} \quad \text{(Eq. 5)}$$

where $$f(X, X_{WP}, X_{BP}) = X_{WP}\left(\left(1 - \frac{X_{BP}}{X_{WP}}\right)\left(\frac{X}{X_{WP}}\right) + \frac{X_{BP}}{X_{WP}}\right) \quad \text{(Eq. 6)}$$

and the subscript "WP" refers to the values of XYZ for the white point of the display and "BP" refers to the correction to the value of XYZ at black, i.e. RGB=0. Thus, the values which are optimized in steps 1-9 above are $X_{BP}$, $Y_{BP}$, and $Z_{BP}$.

The above chromaticity and/or black point corrections can be performed separately for each RGB display profile. Alternatively, the corrections can be performed once and applied to all profiles since the corrections should be applicable to all monitors. In order to calculate and apply the corrections universally, calculation described in Example 2 can be performed once and applied to all displays since the calculation is made in a device-independent space (XYZ). Alternatively, Example 1 can be performed in an intermediate RGB color space such as AdobeRGB1998. The values of XYZ calculated from the values of RGB for as specific monitor in Equation 4 above with no adjustment to $RGB_{BP}$ can be transformed to the intermediate space such as AdobeRGB. The intermediate values of RGB can then be reconverted to new values XYZ' by applying an RGB black point correction to the intermediate space as described in Example 1 above.

It is noted that even if the procedure above is followed, there may still be visual differences between images illuminated by a D50 simulator and the images displayed on a monitor wherein the corrections described above have been applied. In other words, even if an emissive spectral measurement device confirms via measurement that colors on a display match colors in a lightbox, there may be visual differences between the two. This is due to the possibility that the tristimulus human observer functions may not be exactly correct, particularly in regions of near-neutral color, i.e. whites, grays, and very dark blues.

The technique described herein is effective for addressing measurable and quantifiable differences between illuminated printed colors and colors on an emissive display. It is also effective for addressing visual differences arising from inaccuracies in the human observer functions in dark, near-neutral regions of color. Since this latter phenomenon has not yet been resolved via standard metrics such as XYZ or L*a*b*, a visual correction procedure may be required in order to achieve a good visual match. This means that black point corrections for RGB or XYZ can be determined visually for a specific source of illumination, such as a GTI lightbox or a JustNormlicht lightbox and the corrections can be applied for all monitors whenever a specific lightbox is used for comparing printed samples to images on the computer display.

Thus, in addition to the method described above, we also describe a system for ensuring accurate visual matches between images on a display and printed images illuminated by a simulated standard light source such as D50. The system allows the user to indicate the specific light source hardware such as OTT or JustNormlicht in the calibration application. The system calibrates the monitor and creates an accurate RGB profile for the display in standard illumination. The system then proceeds to apply corrections to the profile in order to obtain a good visual match to the hard copy viewed in the non-standard illumination. The corrections can include any or all of the following:

1) White point corrections to address measurable differences between the standard illumination and non-standard (for example, $\Delta a^*$ $\Delta b^*$ measurable difference in white point from D50). This can be performed for example by measuring the light reflecting from a neutral white paper with an emissive device, calculating XYZ, scaling by $100.0/Y_{emissive}$, calculating a*b*, and defining the shifts to be, $\Delta a^* = a^*$, $\Delta b^* = b^*$.
2) Chromaticity corrections and black point corrections to address measurable differences in metamerism. These corrections would be preferably based on measurement and error minimization as described above, although the differences could be ascertained via adjustment and visual comparison.
3) Chromaticity, white point, and black point corrections to address non-measurable visual differences arising from inaccuracies of the human observer functions. Once all measured differences have been minimized between reflective colors under illumination and colors displayed on a computer screen, any remaining visual mismatches can be attributed to errors in the human observer functions used to calculate XYZ from spectral data. Corrections that appear consistent for multiple types of monitors relative to a given source of illumination can be attributed to the illumination and applied whenever that illumination is used. Corrections that appear necessary for certain displays but not others can be attributed to the unique spectral properties of that display and applied whenever that display is used.

Thus, the catagories of corrections that may be required are as follows:

1) Corrections for measurable differences in white point based on illumination:
   $\Delta a^*_{wp} \Delta b^*_{wp}$
   This correction is applied to the white point of the display.
2) Corrections for measurable metamerism for each source of illumination:
   $(\Delta x \Delta y)_{im}$ where i denotes R, G, and B or
   $(\Delta X \Delta Y \Delta Z)_{im}$, where i denotes R, Y, G, C, B, and M, and
   $BPC_{im}$ where i denotes R, G, B or X, Y, Z.
3) Corrections for imperfect human observer functions. Examples of corrections and the calculations for addressing errors in the human observer functions are given U.S. Pat. Nos. 7,209,147 and 7,215,343, and U.S. patent application Ser. No. 12/533,313, filed Jul. 31, 2009, all commonly-assigned and incorporated herein by reference. In general, these corrections can be captured in a manner similar to the corrections for metamerism using visual matching tools (e.g. Photoshop or other tools that allow a user to identify/specify device-independent color values for a displayed color that matches a hardcopy color):
   $\Delta a^*_{wxyz} \Delta b^*_{wxyz}$
   $(\Delta X \Delta Y \Delta Z)_{ixyz}$ where i denotes R, Y, G, C, B, and M, and
   $BPC_{ixyz}$ where i denotes R, G, B or X, Y, Z.

The corrections for imperfect human observer functions can be stored and applied separately for each category of illumination (such as GTI or JustNormlicht illumination) and for each category of display model (such Apple 23" Cinema Display or Eizo CG301W 30" display). In some cases, some monitors within a specific category may also require visual correction for monitor-wise spectral variations.

The invention has been described in detail with particular reference to certain preferred embodiments thereof, but it will be understood that variations and modifications can be effected within the scope of the invention.

Parts List 110 obtaining device-independent color data corresponding to standard illumination
120 obtaining device-independent color data corresponding to the non-standard illumination
130 estimating first device independent color data to be measured on a display for each color when rendering the set of print colors to the display using the device-independent color data corresponding to a standard illumination and a display profile constructed from color data corresponding to the display
140 estimating second device independent color data to be measured on the display if the display profile is adjusted
150 calculating differences between the second device-independent color data and the device-independent color data for the print colors corresponding to the first illumination
160 adjusting the display profile to reduce the differences
210 $XYZ_{D50}$ data
220 $XYZ_{D50Simulation}$ data
230 RGB display profile
240 processor
250 illuminant adjusted RGB display profile
310 measure CIELAB data
320 measure the same colors emissively
330 identify a display profile
340 adjust the display profile
350 convert each value of $XYZ_{D50}$ to $RGB_{display}$ using adjusted RGB display profile
360 convert $RGB_{display}$ to $XYZ_{Adj}$ using original RGB display profile
370 calculate differences between $XYZ_{Adj}$ and $XYZ_{D50\ Simulation}$
380 determine whether the differences between $XYZ_{Adj}$ and $XYZ_{D50\ Simulation}$ are smaller than a predetermined difference
390 output adjusted RGB profile to simulate effects of illuminant

The invention claimed is:

1. A method for compensating for effects of illumination when comparing soft proofs to hard copy proofs viewed under a first illumination comprising:

obtaining, for a set of print colors, device-independent color (DIC) data corresponding light reflected from the set of print colors under standard illumination;
obtaining, for the set of print colors, DIC data that corresponds light reflected from the set of print colors under the first illumination;
obtaining, for a set of colors emitted from a display, DIC data that corresponds to the light emitted by the display, wherein RGB values for the set of colors emitted are calculated from the print colors under standard illumination and from a non-adjusted standard illumination display profile;
adjusting the standard illumination display profile to reduce a measured error between light reflected from the set of print colors under the first illumination and light emitted for the display;
estimating DIC data produced by the display when rendering the print colors based on the adjusted profile;
calculating differences between the estimated DIC data and the DIC data for light reflected from the set of print colors under corresponding to the first illumination; and
further adjusting the display profile to reduce the differences.

2. The method of claim 1 wherein estimating DIC data produced by the display when rendering the print colors based on the adjusted profile comprises, for each color:

converting the DIC coordinate for the print color in standard illumination into a display color coordinate using the adjusted display profile; and
converting the display color coordinate into a DIC coordinate using a display profile created to match display colors to the standard illumination.

3. The method of claim 1, wherein obtaining comprises determining the reflectance spectra for each print color in the set of print colors and calculating the DIC data using the standard illumination and the first illumination.

4. The method of claim 1, wherein the DIC data for the second illumination is calculated from direct emissive spectral measurement.

5. The method of claim 1, wherein the obtaining comprises determining the DIC data from profiles corresponding to either the standard illumination or the first illumination.

6. The method of claim 1 wherein adjusting the display profile comprises performing region-specific chromaticity adjustments to the display profile.

7. The method of claim 1 wherein adjusting the display profile comprises performing black point adjustments to the display profile.

* * * * *